US012759864B2

(12) United States Patent
Giacomini

(10) Patent No.: US 12,759,864 B2
(45) Date of Patent: Oct. 13, 2026

(54) FLEXIBLE MARTINGALE WITH SLIDING REIN RINGS

(71) Applicant: Jean Philippe Giacomini, Harrodsburg, KY (US)

(72) Inventor: Jean Philippe Giacomini, Harrodsburg, KY (US)

( * ) Notice: Subject to any disclaimer, the term of this patent is extended or adjusted under 35 U.S.C. 154(b) by 0 days.

(21) Appl. No.: 19/226,858

(22) Filed: Jun. 3, 2025

(65) Prior Publication Data

US 2026/0109593 A1 Apr. 23, 2026

Related U.S. Application Data

(63) Continuation-in-part of application No. 18/922,990, filed on Oct. 22, 2024, now abandoned.

(51) Int. Cl.
*B68B 5/00* (2006.01)

(52) U.S. Cl.
CPC .................................... *B68B 5/00* (2013.01)

(58) Field of Classification Search
CPC ....................................................... B68B 5/06
See application file for complete search history.

(56) References Cited

U.S. PATENT DOCUMENTS

| | | | | |
|---|---|---|---|---|
| 773,015 A | | 10/1904 | Kenny | |
| 3,533,219 A | | 10/1970 | Smith | |
| 3,604,183 A | * | 9/1971 | Iseli | B68B 1/04 54/6.1 |
| 4,453,371 A | * | 6/1984 | Abbott-Davies | B68B 1/04 54/35 |
| 10,696,538 B2 | | 6/2020 | Nelson | |
| 2001/0022067 A1 | * | 9/2001 | Dabbs | B68B 5/00 54/6.1 |
| 2008/0250761 A1 | * | 10/2008 | Bentley | B68B 1/04 54/71 |
| 2010/0146913 A1 | | 6/2010 | Roberts | |
| 2025/0128933 A1 | * | 4/2025 | Giacomini | A01K 15/02 |

FOREIGN PATENT DOCUMENTS

| | | |
|---|---|---|
| EP | 1874672 B1 | 1/2008 |

* cited by examiner

*Primary Examiner* — Jessica B Wong
(74) *Attorney, Agent, or Firm* — Michael Coblenz

(57) ABSTRACT

The present invention is a modified martingale with a flexible central loop and rein rings that slide on the flexible central loop. The flexible central loop is attached in front of the animal's chest to a standard martingale chest strap and a leather loop around the neck, both adjustable to the horse's size and conformation. Standard reins run through the sliding rein rings, which can change their position on the central loop depending upon which way the rider pulls the reins. The flexible central loop can deform to the pull pressure of the reins, which will mitigate the pressure applied to horse's head, to prevent sudden and forceful pressure that could potentially startle or harm the horse.

16 Claims, 5 Drawing Sheets

FLEXIBLE MARTINGALE WITH SLIDING REIN RINGS

CROSS REFERENCE TO RELATED APPLICATIONS

This application is a Continuation in Part of U.S. application Ser. No. 18/922,990 filed on Oct. 22, 2024, which claims priority to U.S. provisional application Ser. No. 63/545,188 filed on Oct. 22, 2023, and fully incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates to a modified martingale, and more specifically to a flexible martingale with sliding rein rings, which helps vary and modulate the forces from the reins applied to the horse's mouth or head, which helps to train a horse and helps a rider control the horse.

Description of the Related Art

Riders control a horse with equipment, known in the art as tack, that is attached to the horse. The saddle is attached to the horse with a strap around the widest part of the belly, called a girth strap, or simply a girth. In some cases there is also a chest band or breast plate, that runs across the chest of the horse in front of the forelegs and attaches to the saddle. There is headgear attached to the horse's head, which can include a noseband or nosepiece that encircles the horse's head just behind mouth, a crownpiece that goes over the top of the horse's head behind the ears and is connected to a throatlatch that runs from the ends of the crownpiece and under the animal's throat. Theres is a cheekpiece on either side of the animal's head, which runs from the noseband to the crownpiece and throatlatch. The two most common types of headgear are the bridle and the hackamore. A bridle includes both the headstall that holds a bit that goes in the mouth of a horse, and the reins that are attached to the bit. It provides additional control and communication through rein pressure. A hackamore is a type of animal headgear which does not have a bit. Instead, it has a special type of noseband that works on pressure points on the animal's face, nose, and chin. Like a bit, a hackamore can be gentle or harsh, depending on the forces applied by the rider, or how sharply or strongly the rider pulls on the reins. The horse's face is very soft and sensitive with many nerve endings. Misuse of a hackamore can not only cause pain and swelling on the nose and jaw, but improper fitting combined with rough use can cause damage to the cartilage on the horse's nose. These components are attached by snaps or loops, and are well known components in the horsemanship arts. In some cases riders and trainers use a bit, which is inserted into the animal's mouth behind the teeth, and which is attached to the nosepiece. Reins, or riding reins, are elongated straps of material, typically leather, are attached at the front of the headgear, often to the bit or to or near the nosepiece, and are long enough to be held by a rider to control the horse's movement through forces applied to the mouth or head.

The rider or trainer directs the movement of the animal by pulling on one or both reins. To urge the horse to turn right the rider pulls the right rein, which pulls the head to the right, forcing or directing the horse to move to the right. Similarly with the left rein to turn left. When a rider wishes to stop or slow a moving horse, both reins are pulled, forcing the horse's head back slightly. In some cases, however, a horse may lift it's head in response to the rider pulling on the reins. These movements do not come naturally to a horse, so the animal has to be trained to properly respond to the rein force applied to the bit or headgear. During training, the trainer will pull the rein in one direction, which will impart a force onto the bit, if one is being used, or the nosepiece if no bit is used. This will obviously pull the animal's head in the desired direction, but it will also impart pain into the animal's mouth, with a bit, or to the sensitive skin in the face, from the nosepiece. When the animal is moving, and its head is moved in one direction, say the right, it's body will follow and the animal will turn to the right. It will also learn that once it has made the turn to the right the pain will be alleviated as the rider or trainer eases off the reins. So pain inflicted on the animal is part of the training process, but excess pain can startle the animal, or injure or harm the animal, and so should be minimized. The flexible martingale of the present invention helps to minimize and alleviate the infliction of pain in the training process, and while controlling a horse while riding.

It is also important to keep a constant tension on the reins while riding or controlling the horse. If there is no tension on the reins there will be slack on the reins, and then when the rider or trainer pulls on the reins it will result in a sharp jerk when all of the slack is removed and force is applied to the headgear. A good trainer or rider will be able to modulate their pull so that the impact forces will be minor, but there is still some initial force or harsh contact. This is particularly true while the horse is moving or turning, making it much more challenging for the rider or trainer to maintain proper tension on the reins. If there is slack, the horse will also be able to move its head more, and may actually create its own harsh stop when it reaches the limits of the slack and force is returned to the bit or headgear. Riders are trained to maintain tension on the reins and to avoid slack, but this can be difficult while riding, and particularly challenging when turning the horse. The flexible martingale of the present invention allows the rider to maintain tension but still create some springiness or play so that the horse can move its head some and not deal with the sharp jerk full stop force that occurs when the slack is gone. Constant tension on the reins also helps train the horse to maintain a convex neck orientation with the head up to pull against the forces of the reins.

A martingale is a piece of tack that is used to prevent a horse from lifting its head. They are typically attached to the girth or chest band and thus are below the animal's head. They are typically a set length of strap material that includes a pair of loops at the top. The reins ride through these loops. This means that the martingale keeps the reins below the horse's head, and therefore apply tension to prevent the horse from raising its head. A standard martingale consists of two vertical straps with "pass-through" rein rings ("rein rings") adjusted to the point the rider wishes to stop the undesirable head-raising horse behavior. Martingales have been in use for several centuries and use rein-rings attached to straps to create leverage that limits the horse tendency to resist upwards, without any progressive or multi-directional corrective action. When adjusted too long they do not stop the upward movement of the animal's head, and thus have no educational value when training the horse.

Typically the rider will hold the reins relatively taught to avoid slack, so that when they pull on the reins, the pull force is immediately conveyed to the horse's head through the bit or other headgear to control or direct the animal. The rider can use the martingale to pull the horse's head down, by pulling back on the reins. This will force the head down as the horse will seek to relieve the pressure and move towards the pulling force. With a standard martingale, if the horse is behaving normally, and the rider is holding the reins with a slight tightness to control the horse, when the horse attempts to lift its head it will hit a full stop caused by the martingale, which can be painful for the animal. Riders usually prefer to limit the potentially negative effects caused by the pain of this harsh full stop, which most often is that the horse is surprised when he hits the contact and often overreacts to the sudden pain.

There are a number of well-known prior art martingales, such as the Running Martingale, the Bib Martingale, the "German Martingale" (also known as the Olympic Martingale, the Market Harborough in England or the Howlett in France) and the Abott Davies Balancing Rein. These known Martingales all offer no action until the horse lifts his head and hits the end of the 2 straps' length that attaches the rein-ring to the chest strap fixed to the middle of the girth between the horse's front legs. These martingales are described in detail as follows.

The Running Martingale is made of two straps, a neck strap and a chest strap, that are attached to the horse's girth and pass between its front legs. The straps divide into two pieces, with small metal rings at the ends where the reins pass through. Before the horse raising its head, this martingale has no action. When the horse raises its head, the Running Martingale adds downward leverage through the reins to encourage the horse to lower its head. In some cases the horse will resists violently. Running Martingales are typically used in eventing and horse racing, and can also be used in saddle seat and western riding.

The Bib Martingale is a piece of horse tack that helps control a horse's head and reins. A Bib Martingale is a type of running martingale that has a bib made of leather that connect the neck straps and fixes them at a constant distance left-right, it is much more constraining than a standard running martingale because of added limitations to movement. A Bib Martingale helps keep the reins together and prevents the horse from biting the neck straps or raising its head too high. A Bib Martingale can be used as a training aid for horses, especially young horses, and to help with tight turns. A bib martingale works by applying downward pressure on the reins when the horse raises its head. This encourages the horse to lower its head.

The Irish Martingale is used in racing or with young horses, it simply limits the distanced between left and right rein position. It has no downward effect, only laterally and prevents a jumping horse from ending with the reins over his head after landing from a high jump. A Standing Martingale is a piece of horse tack that limits how high a horse can raise its head. It acts directly on the nose and not on the mouth. In polo and roping, it is considered a safety item by preventing the horse from being hit by the polo mallet or the roping lariat (rope). In Show Hunters competition, it is a traditional, aesthetic piece of equipment that is never adjusted as to have any real effect. It is also known as a "TIEDOWN" when used by cowboys: a single strap attached to a strong noseband. The function is the same as the Standing Martingale, but with a different name due to culture ("western" versus "English"). The purpose of a standing martingale is simply to prevent a horse from tossing its head or raising it too high. It also helps keep the horse's head carriage better. A standing martingale is made of leather and has a neck strap that connects to the girth and the noseband. It passes between the horse's front legs.

The German martingale (also known as the "Olympic M," "Market Harborough" in England, "Howlett" in France, "Abbott Davies Balancing Rein) is a piece of tack that consists of a split fork that runs from the horse's chest through the bit's rings and attaches to the reins. There are several rings on the reins as a way to adjust the length of the restraint. It functions like a running martingale in its effect, but with a more progressive leverage. It has a much better educational value for that reason. Its effect becomes obsolete when the horse yields. This martingale helps horses learn to flex at the poll and give to the bit. It works by drawing the horse into a more favorable position, with a flexed poll. When used properly, the bit releases as the horse gives in, rewarding the horse for holding its head in the right position.

The Training Martingale is a piece of horse riding equipment that helps teach a horse to carry its head in a lower, more balanced position. A training martingale is a Y-shaped device with rings on each side that the reins run through. When a horse lifts its head too high, the martingale applies pressure to the bit. It keeps the reins close to the neck. It is mostly used in breed shows (Arabians) to create a steady frame.

There are several patents for variations of these martingales. One of the earliest is U.S. Pat. No. 773,015, to Kenny, issued on Oct. 25, 1904. It consist of a Y-shaped strap attached to the girth or chest piece, with loops at the top of each side of the Y, where the reins ride through the loops. As described above, the purpose of this patented martingale is to keep the horse from raising its head.

Each of these prior art martingales serves a useful purpose, and have been in use for many years, if not centuries. But all induce a constant downward and lateral pressure on the reins and the horse's head. This is because the rein loops of these prior art martingales are fixedly attached to the lower tack, typically the girth or chest strap. This creates a potentially painful full stop if the horse attempts to lift its head, and if the rider does not loosen the reins. This means that the horse goes from the ability to move its head, left and right, up and down, to attempting to lift it's head and having a jarring stop. Since the rein rings of the prior art martingales are fixed, there is no play, or ability to adjust and vary the pressure applied to the horse's head as it attempts to raise it's head. The set rein rings of the prior art martingales also do not allow for varying lateral tension on the reins.

Horses do not respond to these commands naturally, and have to be trained to respond. As is known in the art, a properly trained horse will know how to respond to the rider's guidance through movement of the reins. There are a variety of ways to train a horse, and all require the application of forces on the head gear. But it is better to train the animal with the lightest force possible. Pulling or jerking on the bit or headgear will get the animal's attention, but can startle the animal as well as cause pain and in some cases injury. In general the application of pain is not the best way train an animal. The infliction of pain can make the horse anxious since it will be anticipating future pain. And in most cases the rigid martingales described above have a rigid full stop that can cause pain to the animal. There is a need, therefore, for a martingale that provides a variable pressure on an animal's head during riding and training, which can reduce anxiety in the animal and improve the training of the animal.

SUMMARY OF THE INVENTION

The present invention is a modified sliding martingale. Instead of the fixed rein rings of the prior art, the rein-rings of the flexible martingale of the present invention are sliding on a continuous flexible loop that sits perpendicular to the horse cervical spine and placed against the animal's lower neck. The loop is attached in front of the chest to a standard martingale chest strap and a leather loop around the neck, both of which are adjustable to the horse's size and conformation. The loop may also be attached to a breast plate that is attached to the saddle. The loop is flexible and deformable so that the pressure felt by the animal can vary as the animal moves its head. The reins run though sliding rein rings that vary in position and thus provide a variable pressure on the animal's head. This prevents a rigid full stop and avoids inflicting pain, and allows for improved training of the animal. This helps prevent pain and injury to the animal, but also reduces anxiety, since the infliction of pain, even minor pain, causes an anxiety response in the horse, and makes the animal anxious with anticipation for future pain. As a result, the flexible martingale of the present invention can be considered an anti-anxiety device.

The present invention is a flexible martingale with sliding rein rings for controlling the movement of a horse and used in conjunction with standard horse tack including (1) headgear attached to the horse's head, (2) a breastplate attached to the horse's chest, and (3) reins attached to the headgear and running to the rider, said flexible martingale consisting of: a flexible central loop, said flexible central loop located below the horse's head and attached to the breastplate; two sliding rein rings slidably attached to the flexible central loop and configured to set below the horse's head; wherein said reins run through said sliding rein rings; and wherein when the rider pulls on the reins the flexible central loop deflects to create a gradual pressure on the horse's head. For this flexible martingale, when a rider pulls directly back on the reins, due to the location of the flexible central loop and rein rings below the horse's head, the reins will pull downwardly on the headgear and apply downward pressure on the horse's head to induce the horse to lower it's head, and wherein, due to the flexibility of the flexible central loop, the downward pressure on the horse will be gradual and proportional to the natural resistance presented by the horse. For the flexible martingale with sliding rein rings, the flexible central loop is attached to an adjustable attachment strap, and said adjustable attachment strap attached to the breastplate, which allows the orientation between the rein rings and the horse's head to be adjusted to the rider's requirements. With this flexible martingale with sliding rein rings, the headgear can be a standard bridle with bit placed in the horse's mouth, or a hackamore with a noseband. In the flexible martingale with sliding rein rings, the reins comprise a right rein and a left rein, and the two sliding rein rings comprise a right rein ring and a left rein ring, and wherein further the right rein runs through the right rein ring and the left rein runs through the left rein ring. When a rider pulls the reins to one side it deflects the flexible central loop to that side, and the sliding rein rings slide to that side to create a gradual variable pressure on the headgear and the horse, and allow a rider to control the horse with minimal rein movement. The flexible central loop made of a flexible material to allow deformation of the loop when pressure is applied by the reins on the rein rings.

The present invention can also be described as a flexible martingale with sliding rein rings for training and controlling the posture of a horse and used in conjunction with standard horse tack including (1) headgear attached to the horse's head, (2) a breastplate attached to the horse's chest, and (3) reins attached to the headgear and running to the rider, said flexible martingale consisting of: a flexible central loop, said flexible central loop located below the horse's head and attached to the breastplate; two sliding rein rings slidably attached to the flexible central loop and configured to set below the horse's head; wherein said reins run through said sliding rein rings; and wherein a rider can hold the reins taut so there is no slack between the rider's hands and the headgear, and wherein the flexible central loop can deform to allow some head movement by the horse but with continued light pressure on the headgear, and wherein further the flexible central loop can flex and provide additional give, so that light pressure can always be maintained with no slack on the reins, and wherein further the position of the martingale below the horse's head keeps the reins pulling down to keep the horse's head down and neck convex. In this flexible martingale with sliding rein rings the headgear can be a standard bridle with bit placed in the horse's mouth, or it can be a hackamore with a noseband. Additionally, when the rider pulls directly back on the reins, due to the location of the flexible central loop and rein rings below the horse's head, the reins will pull downwardly on the headgear and will apply downward pressure on the horse's head to induce the horse to lower it's head, and wherein, due to the flexibility of the flexible central loop, the downward pressure will deflect the flexible central loop to reduce so that the downward pressure on the horse will be gradual, allowing the rider to train the horse with gradual pressure. With this flexible martingale with sliding rein rings, the flexible central loop is attached to an adjustable attachment strap, and said adjustable attachment strap attached to the breastplate, which allows the orientation between the rein rings and the horse's head to be adjusted. Furthermore, the reins comprise a right rein and a left rein, and the two sliding rein rings comprise a right rein ring and a left rein ring, and wherein further the right rein runs through the right rein ring and the left rein runs through the left rein ring. Therefore, when a rider pulls the right reins, it pulls the right rein ring and deflects the flexible central loop to create a triangle that lowers the rein rings in relation to the horse's head, further urging the horse to lower it's head during the turn. The deformable material of the flexible central loop allows the flexible central loop to deform in shape to left or right as a rein is pulled to that side, and allows constant tension on both the left and right rein regardless of which direction the horse is being turned.

DETAILED DESCRIPTION OF THE INVENTION

Detailed embodiments of the present invention are disclosed herein. It is to be understood that the disclosed embodiments are merely exemplary of the invention, and that there may be a variety of other alternate embodiments. The figures are not necessarily to scale, and some features may be exaggerated or minimized to show details of particular components. Therefore, specified structural and functional details disclosed herein are not to be interpreted as limiting, but merely as a basis for teaching one skilled in the art to employ the varying embodiments of the present invention.

Figure 1:
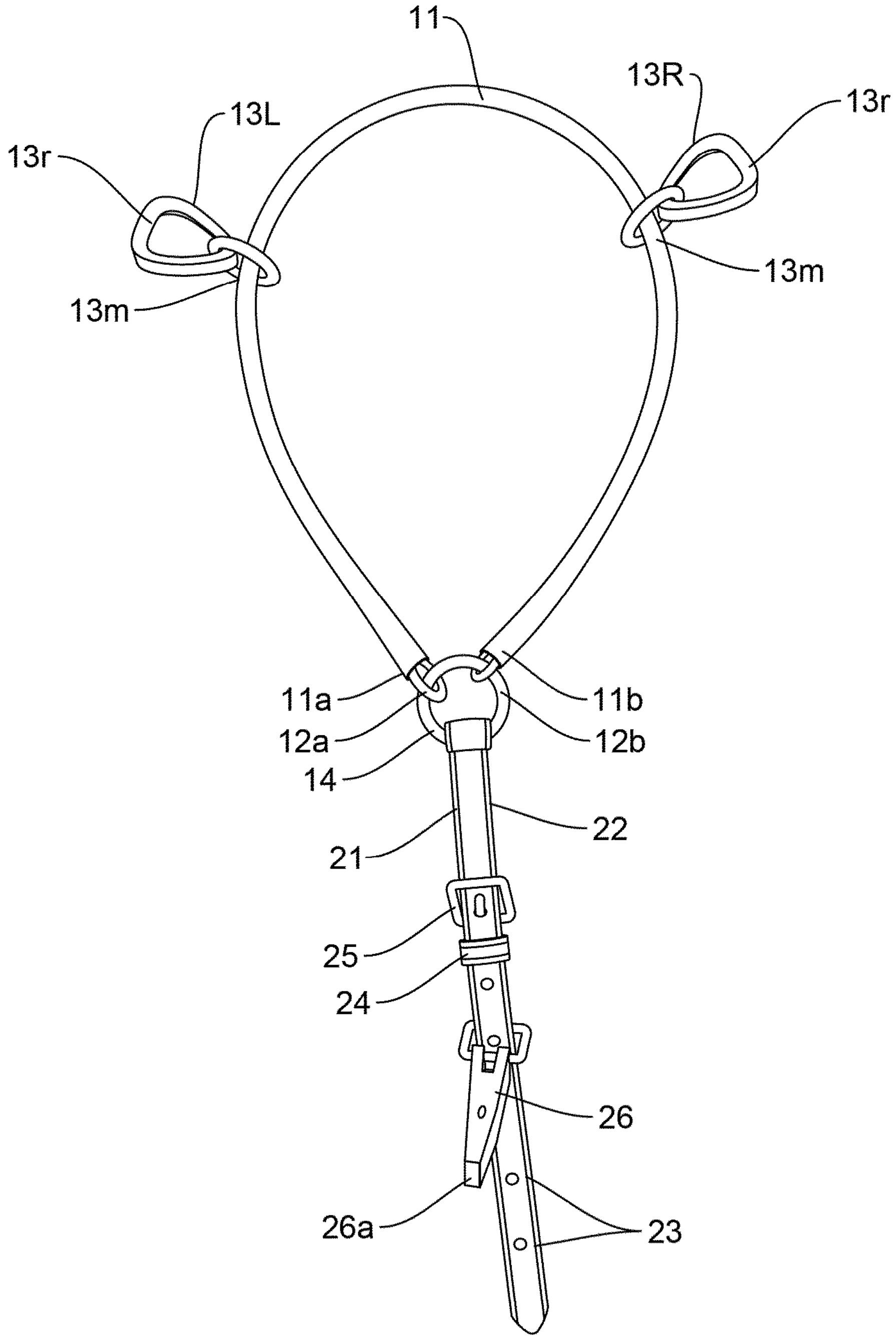
FIG. 1 is a front view of the flexible martingale with sliding rein rings.

FIG. 1 shows the components of the flexible martingale 100. The main component of the flexible martingale 100 is the flexible central loop 11, which is a loop created by a length of soft, pliable, bendable material, such as half or three-quarter-inch vinyl or silicon tubing, or other similar materials. It can also be made of even more flexible and pliable material such as bungee cord or common rope. But in the preferred embodiment it is made from clear half-inch PVC tubing, which will retain its relatively circular shape when attached as described below, and will also provide sufficient flexibility for the sliding martingale. The overall dimensions of the flexible central loop 11 can vary greatly depending on the size of the horse, and its age, and the needs of the trainer or rider. In one embodiment the flexible central loop 11 is roughly six inches in diameter, meaning the overall length of the tubing material is roughly 19 inches. When attached to the attachment strap 21, as described below, the flexible central loop 11 has a generally tear-drop shape as seen in FIG. 1.

The length of the flexible tube that makes up the flexible central loop 11 has a first end 11*a* and a second end 11*b*. There are two attachment hoops 12*a* and 12*b* attached to each end 11*a* and 11*b* respectively. In one embodiment the attachment hoops 12*a* and 12*b* are hoop-end-screws inserted into and screwed into the first and second ends 11*a* and 11*b* of the tubing that creates the flexible loop 11. The attachment hoops 12*a* and 12*b* are attached to the O-Ring 14, which is attached to the adjustment strap 21 as described below. In the preferred embodiment the attachment hoops 12*a* and 12*b* are open ended, and crimped closed when inserted onto the O-Ring 14 to create a semi-permanent attachment. When the flexible central loop 11 is thus attached to the O-Ring 14, it will have a generally tear-drop shape, as shown in FIG. 1. But as pressure is applied, as described below, it will deflect to create a lengthened oval of roughly nine or ten inches in length.

Figure 2:
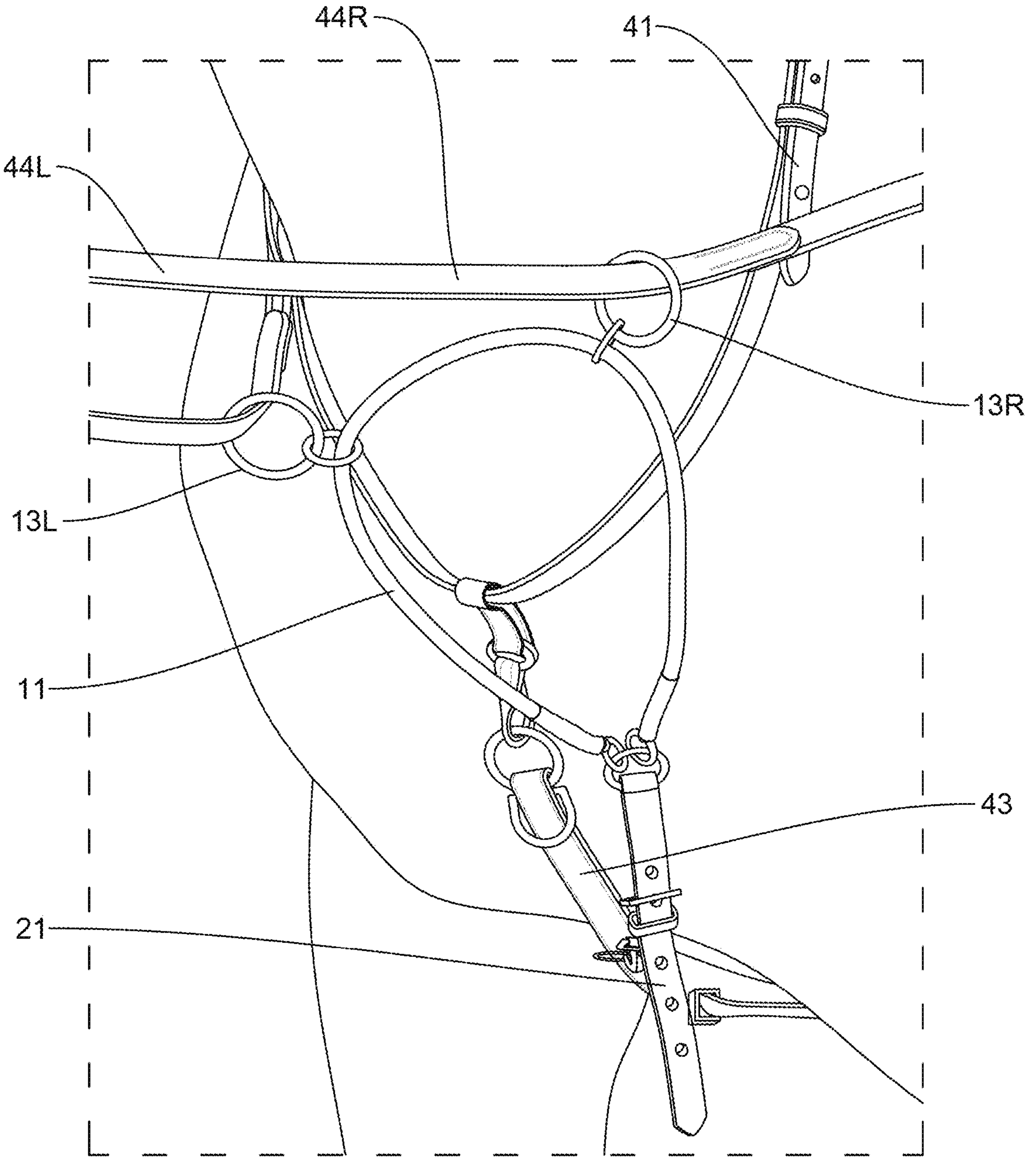
FIG. 2 is a front view of the flexible martingale attached to the standard tack of a horse.
Figure 4:
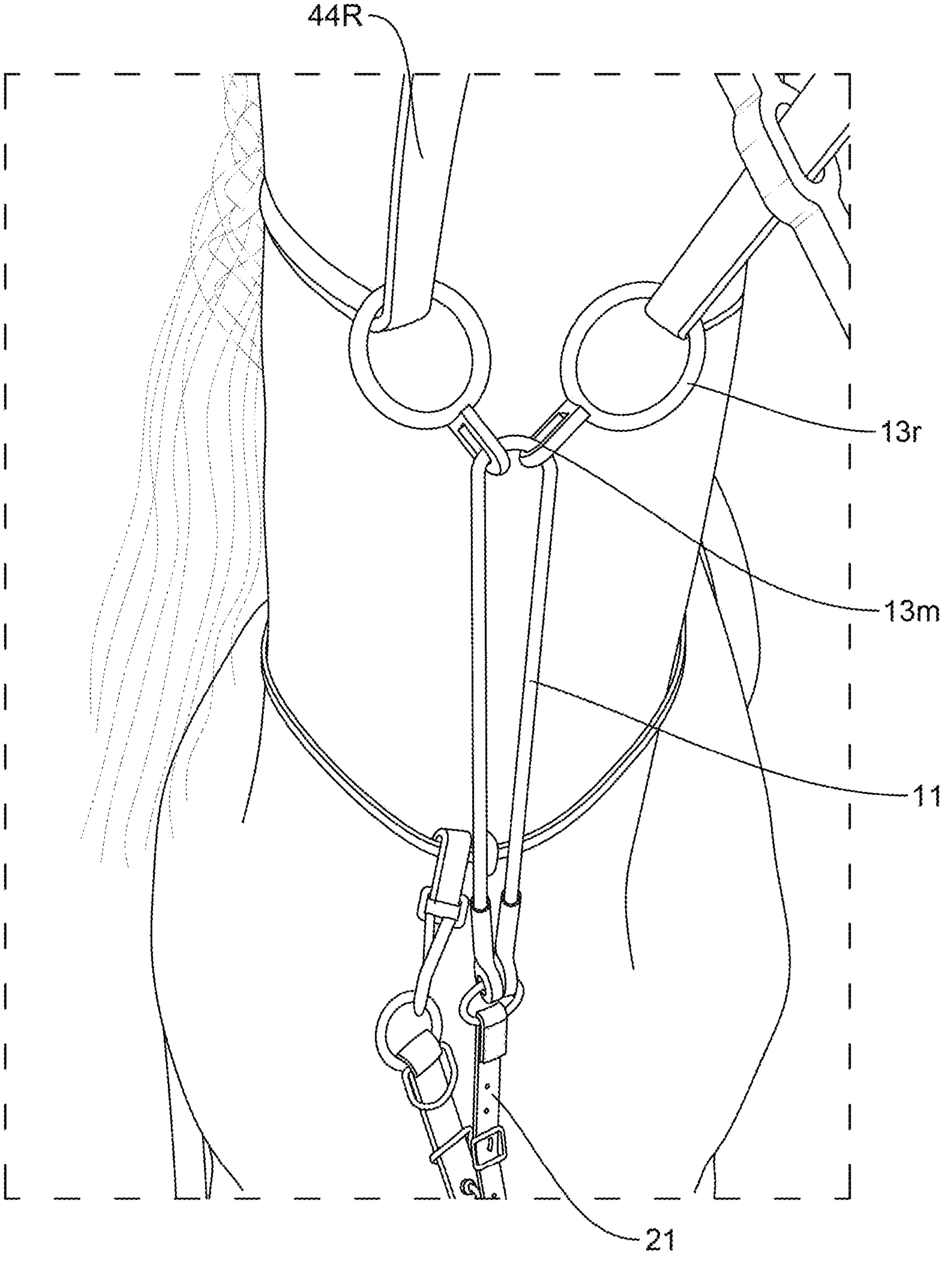
FIG. 4 is a front view of the flexible martingale with the martingale fully stretched.
Figure 5:
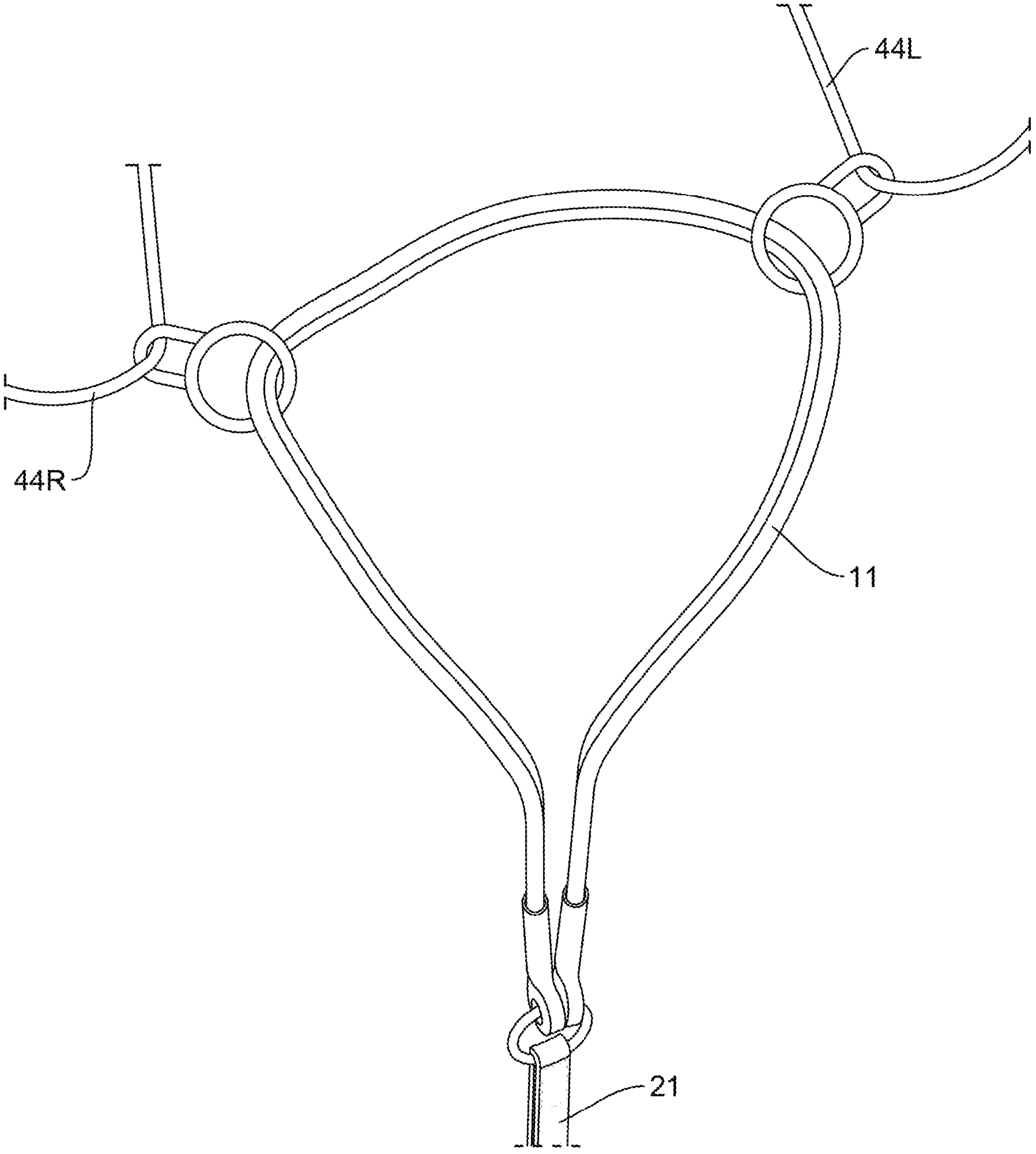
FIG. 5 is a front perspective view of the flexible martingale with the martingale deflected to the side during a turn.

There are two sliding rein rings 13, a right rein ring 13-R and a left rein ring 13-L, slidably attached onto the flexible loop 11. As can be understood, the rein rings 13 are attached to the flexible loop 11 before the attachment hoops 12*a* and 12*b* are securely attached to the O-Ring 14. Each rein ring 13 includes two perpendicularly attached loops, the lower martingale loop 13*m*, and the upper rein loop 13*r*. FIG. 1 shows these as separate loops, but it is within the conception of the invention for the slidable rein rings 13 to be made in a single piece, and two variations of single piece rein rings 13 are shown in FIG. 4 and FIG. 5. As can be seen in FIG. 1, each rein ring 13 slidably rides on the flexible loop 11 with the loop 11 running through the martingale loop 13*m*. The inner diameter of the martingale loop 13*m* is larger than the outer diameter of the flexible loop 11 so that the flexible loop 11 moves within the martingale loop 13*m*, allowing the rein ring 13 to slide. As seen in FIG. 2, the reins 44R and 44L from the horses head H will run through the two rein loops 13R and 13L with the right reign 44R running through the right rein loop 13R and the left rein 44L running through the left loop 13L and on to the rider. The flexible loop 11 is the main element of the flexible martingale 100. It is easily deformable such that it can deform based on the movement of the horses head H, and the rider's hand movements on the reins 44.

Attached to the O-Ring 14 is the adjustment strap 21. The adjustment strap 21 can be any adjustable length strap that connects to the O-Ring 14 and attaches the flexible central loop 11 to the chest strap 43 or girth. In the preferred embodiment, shown in FIG. 2 and FIG. 3, the adjustment strap 21 is a two-piece belt style strap with one piece including a buckle and second piece the length with adjusting holes. Therefore, in the preferred embodiment the adjustment strap 21 includes the top length strap 22, which is attached at the top to the O-Ring 14 and includes a series of evenly spaced holes 23 along the length. In the preferred embodiment the holes 23 are spaced one-half inch apart. Sliding along the length strap 22 is the buckle attachment 24 which includes a common buckle 25 that attaches into the holes 23 to secure the buckle attachment 24 in place. The buckle attachment 24 is a short length of material, typically the same material as the rest of the adjustment strap, which includes the buckle 25 at one end and the tack attachment snap 26 at the other end. The attachment snap 26 includes the attachment snap loop 26*l*, by which the attachment snap 26 is attached to the buckle attachment 24 at one end, and the tack snap 26*t* which is used, as described below, to attach the sliding martingale 100 to the tack of the horse.

Figure 3:
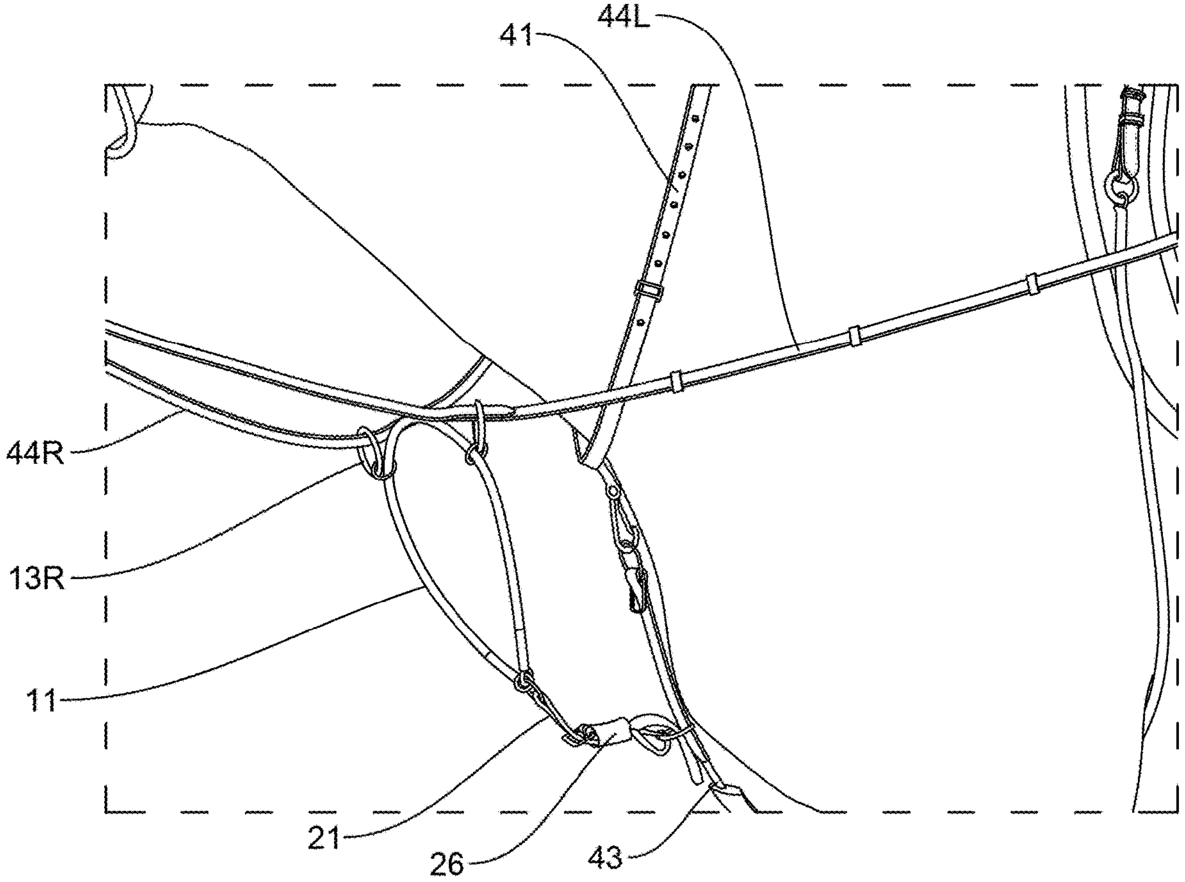
FIG. 3 is a side view of the flexible martingale on a horse.

The length of the flexible martingale 100 can be adjusted for the needs of the horse, and the training of the horse, and its position on the horse can be adjusted by means of the adjustment strap 21. Both parts of the adjustment strap 21 will conventionally be made of leather, nylon, Biothene vinyl, or any similar tough and durable fabric typically used to make horse tack. The attachment strap 26 is used to attach the flexible martingale 100 assembly to the horse's tack, usually by attaching to the standard breast plate or chest strap. As seen in FIG. 2 and FIG. 3, the sliding martingale 100 is attached to the standard chest strap 41, or the martingale chest strap 43 by means of the attachment snap 26*a*.

As can be seen in FIG. 2 and FIG. 3, the sliding martingale 100 consists of a large flexible central loop 11, two smaller sliding loops that are the rein rings 13, and a straight attachment strap 21. Instead of the fixed rein-rings or the prior art, the rein rings 13 of the sliding martingale 100 of the present invention are sliding on a continuous loop perpendicular to the horse cervical spine or neck. The flexible central loop 11 is attached in front of the chest to a standard martingale chest strap 43 and a leather loop around the neck, both of them adjustable to the horse's size and conformation. The present sliding martingale is made of different materials with more or less "give" ranging from a 5% stretch to a 50% stretch. The flexible circular configuration of the flexible central loop 11 means that it is deformable when the horse attempts to raise its head. So rather than the full stop of the standard martingale, the flexible martingale 100 applies increasing pressure as the horse lifts its head. If, as in the preferred embodiment, the flexible loop has a diameter of six inches, it will have a circumference of 18.8 inches (C=πD). That means when the loop material is fully stretched, the flexible central loop 11 will now be an oval of roughly just over nine inches in length. That means that the horse will be able to raise it's head an additional three inches once it hits the constraints of the sliding martingale 100. Additionally, because the flexible material of the flexible central loop 11 has spring or tensile strength, it will exert pressure on the rein rings 13 that will exert pressure on the horse's head. The horse will be able to continue to lift it's head, due to the flexibility of the material of the flexible central loop 11 but will feel the slight downward pressure exerted by the loop.

When a rider is controlling the horse the rider will maintain tension on the reins 44R and 44L so that there is no slack. There are a number of issues with allowing slack on the reins. The first is that the rider is not actively controlling the animal. The second is that when the rider does want to control the animal they will pull on the reins, and if there is slack, when the reins have been pulled to the point where there is no longer slack there will be a jerk or abrupt application of force on the horse's mouth or nose. A competent rider or trainer will be able to slowly and easily apply tension to the reins to prevent a harsh jerk on the animal, but there will still be an immediate application of force, which can be painful or harmful. The third issue is that the horse will more likely move its head when it does not feel the pressure of the reins, and the horse may move its head abruptly and when it hits the limits or point where the reins will stop it, it may be moving its head forcefully, and hurt or injure itself. Good riders know to avoid slack on the reins and to keep at least a light tension on the reins. The flexible martingale 100 allow the rider to keep light tension on the reins 44R and 44L, and there will still be some give or movement due to the give of the sliding rein rings 13, and the flexibility of the flexible central loop 11. This will allow the horse to move its head a bit more than normal with a standard martingale.

The flexible martingale deflects and mitigates excessive hand movements from the rider as well as excessive head movements from the horse, therefore increasing the efficacy of the rider's demands by rapidly eliminating "toxic" interactions between the two, improving the horse's goodwill to perform all the movements required in equestrian sports. Toxic interactions are those which can startle the animal with abrupt pulling on the reins 44 that result in abrupt forces on the bit or headgear and that cause pain to the animal, causing it to flinch or misinterpret a control movement. When activated by the horse's upward deviations from the required head position and/or the excessive backward pulling from the rider's hand, the soft, gradual, proportional downward automatic action created by the flexible martingale 100 results in reducing the rein tension as the horse's head yields slightly backward and the rider's hand yields slightly forward. This results in the desired "lightness of contact" that reduces pressure on the horse's sensitive tongue and jaw bones and is a tenet of correct horsemanship. This experiential improvement has proven to become educational for both horse and rider, as the deviations from the desired horse's head's posture rapidly diminish in frequency and intensity, and the rider's "hand mistakes" also diminish in frequency and intensity. Hand mistakes are those where the rider inadvertently pulls the reins 44 in an unplanned or inadvertent manner. It is self-evident that such positive experiences have an immediate beneficial effect on the behavior and biomechanics of humans and horses.

During training, horse are trained to respond to changes in pressure on its headgear, either the bit or the nosepiece. With the standard martingale the end pressure is an often painful full stop, so the horse goes from no external input on its head movement to a painful full stop of movement. Pain will often startle the animal, and the animal will not react in a manner conducive to learning. Infliction of pain will often make the animal anxious, as it will be awaiting further pain. With the flexible martingale 100 of the present invention there is variable tension as the horse raises its head beyond the set point of the martingale 100, and as it lifts the head further it feels the slight downward pressure, which increases as the head continues to lift. This trains the animal to respond to smaller input pressures. And this allows the trainer to teach the animal to respond to slight or subtle movements, resulting in a better trained animal. It will also allow the subsequent rider to control the animal with lighter pressure on the reins.

The sliding configuration of the rein rings 13 also allows the flexible martingale 100 to change its configuration according to the horse's head position and the rider's actions. If the horse raises his head, the loop 11 becomes progressively narrower, tighten the side of the bit in the horse's mouth and progressively, and quickly, convinces the animal to return to a lower position that becomes progressively more comfortable. If the horse raises one side of his head, the rein-ring 13 follows and resists it progressively, exerting pressure to force the horse to bringing its head back to level, also progressively. The pressure increases in very small increments, and the relief also increases in equally small increments. FIG. 4 depicts the flexible central loop 11 when either the horse has raised its head, or the rider has pulled back on the reins 44. As seen, the flexible central loop 11 is stretched and narrows, and the rein rings 13 come closer together and are at the top of the central loop 11. While changing position creates tension on the reins 44, which is applied to the headgear, the flexible material of the flexible central loop 11 allows the animal to pull and not have an immediate full stop.

As can be seen in FIG. 5, when the riders turns the horse by moving one hand to the side, which pulls the rein 44 on that side, which pulls the horse's head to that side, the flexible central loop 11 turns into a wider triangle. As the central loop 11 becomes a triangle it lowers both rein-rings 13L and 13R, because the flexible central loop 11 is attached to chest strap or girth, and because the rein rings 13L and 13R are lower, it entices the horse to keep its head low, and turn in a lower and classically desirable head position. If, as occurs in some situations, the horse completely inverts the shape of his neck, from the normal convex to a concave position, which has a profoundly negative effect on its entire musculature, which often happens before or after jumping an obstacle, the sliding martingale 100 will bring the horse back painlessly to the normal and desirable convex neck shape. In use, the effect has proven so persuasive that its effect becomes obsolete quite rapidly.

The flexible martingale with sliding rein rings 100 is an educational equine training tool that provides soft and effective control in training an animal. It eliminates the purposeful infliction of pain as a training tool, and thus reduces anxiety in the horse, making the horse more responsive to training and input commands from the reins. This can best be shown with the example of training a horse to make the rapid turns or a "figure-8" pattern. 'Serpentines' and 'Figure 8s,' as these rapid tight turns are called, are foundational exercises for all horses, from racing to reining, dressage, showjumping, or endurance. As a result they are frequently used in training. The included frequent and rapid turns create symmetry of movement for the horse, which results in a regular rhythm, roundness and relaxation of the topline—as the muscles running along the spine from the neck to the croup are called—which results in a supple neck and long-term soundness in the animal. Conducting training of these patterns with the flexible martingale 100 develops the accuracy of the animal's performance. Normally these quick turns leave slack in the reins 44 as the rider quickly moves from pulling the reins from the right to the left, then to the right. Typically this quick shift in hand pressure almost always results in the creation of some slack on the reins. But, with the flexible martingale 100 constant tension can be maintained on the reins 44 and there will be no slack, and as a result no painful jerk on the headgear when tension is resumed. These quick turns flex the back laterally and encourage the horse to lengthen his entire body on the outside of the turn. The animal arches its neck and opens the throat latch in a forward and downward direction, as a foundation of all classical training principles. When the horse is directed to make a small turn (10 feet diameter, as a horse would do when turning around in a small stall), the rider or trainer will use a shortened opening rein on the inside, pulling the animal's head into the turn, while releasing the outside rein, with the rider's weight squarely loaded on the outside stirrup. It is fundamental for the inside hand to move away from the neck inside the turn and never pull back toward the shoulder. Pulling back would block it, reduce its range of motion, stiffen the neck, compromise the rhythm and the impulsion, this is how we see many horses plainly refusing to turn. To train the animal in this manner, start the process at the walk, then continue in trot and canter and progressively increase speed. The more frequent the turns, the easier it is to obtain the correct response to increasingly lighter turning aids, suppleness and relaxation. Because the smallest turns technique asks for the maximum bending of the horse's back, the wider turns become automatically more symmetrical and much easier to achieve.

When the rider uses an opening rein to turn (inside hand away from the neck, like opening a book), the flexible martingale 100 flexible loop 11 geometry becomes wider and lowers the contact on the inside of the turn. The outside rein follows softly without being shortened and the contact pressure remains on both reins, and so there is no slack on the outside rein. Through its progressive "sliding" action, the horse is quickly persuaded, by the restraining pressure of the sliding martingale 100 to turn, bend, and lower his head at the same time without resistance. This exercise decompresses the thoracic vertebrae and stretches all the muscles on the outside of the body.

By improving the lateral balance and the uprightness, the flexible martingale 100 relaxes and slows down anxious horses. For the animal, more balance equals less fear of falling, which creates less anxiety, and results in less likelihood of bucking. Shorter turns with a pronounced bend are the most effective way to do the following: (a) Loosen the neck and tilt the withers slightly to the outside, which is key to lateral flexion and uprightness for balance. It is greatly facilitated by loading the outside stirrup and releasing the outside rein. (b) Round the topline without compression back to front (or front to back). This type of turns followed by a neck stretch to the ground were one of Master Oliveira favorite exercises. (c) Free the shoulders and increase their lateral range of motion, the outside one has to reach forward and inward to cover the extra ground on the outside of the turn or circle. (d) To engage and flex the inside hind leg and increase the drive of the outside hind leg. (e) Prevent inversion of the topline. A convex neck is a reflection of pain and anxiety in the animal, and a convex neckline is a reflection of a calm or relaxed animal. And a more relaxed horse is easier to train, and more receptive to learning.

I claim:

1. A flexible martingale with sliding rein rings for controlling the movement of a horse and used in conjunction with standard horse tack including (1) headgear attached to the horse's head, (2) a breastplate attached to the horse's chest, and (3) reins attached to the headgear and running to the rider, said flexible martingale comprising:

a flexible central loop that retains it's shape, said flexible central loop located below the horse's head and attached to the breastplate;

two sliding rein rings slidably attached to the flexible central loop and configured to set below the horse's head;

wherein said reins run through said sliding rein rings;

and wherein when the the reins are pulled the flexible central loop deforms to create a gradual pressure on the horse's head; and wherein when the reins are pulled directly back, due to the location of the flexible central loop and rein rings below the horse's head, the reins will pull downwardly on the headgear and apply downward pressure on the horse's head to induce the horse to lower it's head, and wherein, due to the flexibility of the flexible central loop, the downward pressure on the horse will be gradual and proportional to the natural resistance presented by the horse.

2. The flexible martingale with sliding rein rings of claim 1, wherein said flexible central loop is attached to an adjustable attachment strap, and said adjustable attachment strap attached to the breastplate, which allows the orientation between the rein rings and the horse's head to be adjusted to the rider's requirements.

3. The flexible martingale with sliding rein rings of claim 1, wherein said headgear is a standard bridle with bit placed in the horse's mouth.

4. The flexible martingale with sliding rein rings of claim 1, wherein said headgear is a hackamore with a noseband.

5. The flexible martingale with sliding rein rings of claim 1, wherein the reins comprise a right rein and a left rein, and the two sliding rein rings comprise a right rein ring and a left rein ring, and wherein further the right rein runs through the right rein ring and the left rein runs through the left rein ring.

6. The flexible martingale with sliding rein rings of claim 5, wherein when the reins are pulled to one side it deflects the flexible central loop to that side, and the sliding rein rings slide to that side to create a gradual variable pressure on the headgear and the horse, and allow a rider to control the horse with minimal rein movement.

7. The flexible martingale with sliding rein rings of claim 5, wherein when one rein is pulled it deflects the flexible central loop to that side, and the sliding rein rings slide to that side to create a triangle which lowers the rein rings further below the horse's head, increasing the downward tension on the headgear and urging the horse's head lower in the turn.

8. The flexible martingale with sliding rein rings of claim 1 wherein the flexible central loop can be made of a flexible material to allow deformation of the loop when pressure is applied by the reins on the rein rings.

9. A flexible martingale with sliding rein rings for training and controlling the posture of a horse and used in conjunction with standard horse tack including (1) headgear attached to the horse's head, (2) a breastplate attached to the horse's chest, and (3) reins attached to the headgear and running to the rider, said flexible martingale comprising:

a flexible central loop, said flexible central loop located below the horse's head and attached to the breastplate;

two sliding rein rings slidably attached to the flexible central loop and configured to set below the horse's head;

wherein said reins run through said sliding rein rings; and wherein when the reins are held taut there is no slack between a rider's hands and the headgear, and wherein the flexible central loop can deform to allow some head movement by the horse but with continued light pressure on the headgear, and wherein further the flexible central loop can flex and provide additional give, so that light pressure can always be maintained with no slack on the reins, and wherein further the position of the martingale below the horse's head keeps the reins pulling down to keep the horse's head down and neck convex.

10. The flexible martingale with sliding rein rings of claim 9, wherein said headgear is a standard bridle with bit placed in the horse's mouth.

11. The flexible martingale with sliding rein rings of claim 9, wherein said headgear is a hackamore with a noseband.

12. The flexible martingale with sliding rein rings of claim 9, wherein further, when the reins are pulled directly back, due to the location of the flexible central loop and rein rings below the horse's head, the reins will pull downwardly on the headgear and will apply downward pressure on the horse's head to induce the horse to lower it's head, and wherein, due to the flexibility of the flexible central loop, the downward pressure will deflect the flexible central loop to reduce so that the downward pressure on the horse will be gradual.

13. The flexible martingale with sliding rein rings of claim 9, wherein said flexible central loop is attached to an adjustable attachment strap, and said adjustable attachment strap attached to the breastplate, which allows the orientation between the rein rings and the horse's head to be adjusted.

14. The flexible martingale with sliding rein rings of claim 9, wherein the reins comprise a right rein and a left rein, and the two sliding rein rings comprise a right rein ring and a left rein ring, and wherein further the right rein runs through the right rein ring and the left rein runs through the left rein ring.

15. The flexible martingale with sliding rein rings of claim 14, wherein when the right rein is pulled, it pulls the right rein ring and deflects the flexible central loop to create a triangle that lowers the rein rings in relation to the horse's head, further urging the horse to lower it's head during the turn.

16. The flexible martingale with sliding rein rings of claim 14 where the deformable material allows the flexible central loop to deform in shape to left or right as a rein is pulled to that side, and allows constant tension on both the left and right rein regardless of which direction the horse is being turned.

* * * * *